(12) United States Patent
Riley et al.

(10) Patent No.: US 6,571,686 B1
(45) Date of Patent: Jun. 3, 2003

(54) BREW BASKET WITH OVERFLOW CHANNEL

(75) Inventors: Darren Riley, Fort Mill, SC (US); Alan Burton, Hattiesburg, MS (US); Jeffrey T. Stout, Smyrna, GA (US); Peter A. Pickett, II, Hattiesburg, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/973,943

(22) Filed: Oct. 9, 2001

Related U.S. Application Data

(63) Continuation of application No. 09/760,199, filed on Jan. 12, 2001, now abandoned.

(51) Int. Cl.$^7$ ................................................ A47J 31/00
(52) U.S. Cl. ............................ 99/299; 99/309; 99/306; 99/305
(58) Field of Search ........................ 99/304, 305, 306, 99/307, 308, 309, 311, 299

(56) References Cited

U.S. PATENT DOCUMENTS

| | | | |
|---|---|---|---|
| 1,175,858 A | 3/1916 | Wojidkow | |
| 1,276,774 A | 8/1918 | Kuhn et al. | |
| 1,887,354 A | 11/1932 | Kapner | |
| 4,309,940 A | * 1/1982 | Lowerre, Jr. | ............... 99/311 X |
| 5,133,247 A | 7/1992 | Pastrick | |
| 5,168,794 A | * 12/1992 | Glucksman | ............... 99/299 X |
| 5,699,719 A | 12/1997 | Lucas et al. | |
| 5,964,141 A | * 10/1999 | Andrew et al. | ........... 99/307 X |
| 6,425,317 B1 | * 7/2002 | Simmons | ..................... 99/299 |

FOREIGN PATENT DOCUMENTS

| | | | | |
|---|---|---|---|---|
| GB | 2229354 | * | 9/1990 | ................... 99/307 |

\* cited by examiner

*Primary Examiner*—Reginald L. Alexander
(74) *Attorney, Agent, or Firm*—Lawrence J. Shurupoff

(57) ABSTRACT

A brew basket is provided that is dimensioned to be received within the brew basket support member of an associated brewing machine such as a coffee maker. The brew basket includes an anti-drip valve mounted within a lower cavity and to the lower surface of the bottom wall. The brew basket is provided with an overflow return for diverting brewing water from the brew basket to the brewing machine carafe or other beverage receptacle if the brewing water reaches a level presenting potential overflow from the brew basket.

50 Claims, 5 Drawing Sheets

BREW BASKET WITH OVERFLOW CHANNEL

CROSS-REFERENCE TO RELATED APPLICATION

This applications is a continuation of prior application Ser. No. 09/760,199, filed Jan. 12, 2001, now abandoned priority from the filing date of which is hereby claimed under 35 U.S.C. §120.

FIELD OF THE INVENTION

The present invention relates generally to brewed beverage devices, and in particular, to brew baskets for use in brewed beverage devices such as coffee makers.

BACKGROUND OF THE INVENTION

The portable electric coffee maker has for many years been one of the most popular domestic electric appliances for consumers desiring brewed beverages at home. One type of conventional coffee maker comprises a housing defining a water reservoir and a filter basket support pivotally coupled thereto. The housing includes a platform having a warmer plate which supports a carafe below the filter basket support. A brew or filter basket is removably supported within the filter basket support, and the filter basket support is pivotally moveable relative to the housing about a vertical axis. Mounted within the housing and in fluid communication with the water reservoir is a heater unit. The heater unit receives water from the water reservoir, heats the water, and pumps the water by thermal expansion to the top of the housing for drainage or dispersion into the filter basket. The heated water drains through the coffee grounds within the filter basket and into the carafe therebelow.

Common brew or filter baskets are generally cylindrical in shape and include a frusto-conical inner cavity for receiving a filter. Typically, these common filter baskets include a type of anti-drip valve mechanism which is located at the filter basket outlet opening. The primary object of such anti-drip valves is to prevent coffee from continuing to flow or drip from the filter basket when the carafe is removed from the coffee maker. The anti-drip valve mechanism associated with conventional coffee makers generally operate by means of a spring biased lever arm that holds a stopper seal that is located at one end of the lever arm firmly against the outlet opening of the filter basket. An actuator, pivotally coupled to the coffee maker, is in contact with the other end of the lever arm to pivot the lever arm and stopper seal between two positions. When the carafe is positioned below the filter basket, the actuator engages the lever arm and pivotally displaces the lever arm so that the brewed beverage can drain through the outlet opening of the filter basket and into the carafe. Upon removal of the carafe the lever arm is moved to a position in which the lever arm stopper seal is biased firmly against the filter basket outlet opening.

However, coffee makers, particularly those with anti-drip mechanisms, are susceptible to overflow problems in that the brewing water may reach a level within the filter basket that causes the brewing water to flow over the brewing basket rim. Consumers have discovered that the carafe may be temporarily removed during the brewing cycle and that the anti-drip valve will prevent coffee from continuing to flow from the filter basket. In many instances, removal of the carafe by a user during the brewing cycle is to obtain a cup of coffee without waiting for the complete cycle of the coffee maker. In such instances, with the carafe removed, the anti-drip valve closes during the brewing cycle, causing the brewing water to build up in the filter basket and opens when the carafe is returned to the coffee maker. A problem can occur, however, if the carafe is not returned to the proper location within the coffee maker. When the carafe is not properly aligned within the coffee maker and the actuator does not fully contact the lever arm, the anti-drip valve may not fully open, thereby causing a condition whereby the brewing water accumulates within the filter basket at a faster rate than that at which the brewing water is exiting through the filter basket outlet opening. This results in the brewing water overflowing the filter basket. Hence, the coffee and grounds run down the back and sides of the filter basket support which is unacceptable in modern coffee makers as this situation often leads to consumer dissatisfaction and product returns.

The filter basket can overflow for reasons other than misalignment of the carafe within the housing of the coffee maker. For example, filters used with the filter basket for holding coffee grounds can become clogged, thereby fully or partially restricting the flow of the brewing water out through the filter basket outlet opening. This condition also can cause brewing water overflow, with resulting consumer dissatisfaction and product returns.

Therefore, there is a need to provide coffee makers with an overflow return mechanism that can eliminate the deficiencies of the prior art.

SUMMARY OF THE INVENTION

In accordance with the present invention, a brew basket is provided for a brewing machine to address the deficiencies of the prior art. More specifically, a brew basket is provided with a overflow return mechanism for diverting brewing water and returning the brewing water to an associated container if the brewing water overflows the brew basket.

In accordance to an aspect of the present invention, the brewing container comprises a body portion including a bottom wall having an outlet opening that allows the brewing water to flow into an associated container that is located below the brewing container. The brewing container body portion also includes an annular sidewall that extends upwardly from the bottom wall to define a cavity. The cavity receives infusible substrate such as ground coffee and the brewing water. The brew container further comprises an overflow return mechanism operably associated with the body portion. In operation, the overflow return mechanism diverts brewing water and directs the diverted brewing water to the associated container when the brewing water reaches an overflow condition where the brewing water overflows the cavity.

In accordance with another aspect of the present invention a brewing container is provided that comprises a bottom wall having a drain aperture for allowing brewing water to flow therethrough and into an associated container. An annular sidewall upwardly extends from the bottom wall to define a body portion having a cavity therein. The cavity is capable of receiving an infusible substrate and the brewing water. The brewing container further comprises an overflow return mechanism including a diverting aperture disposed through the sidewall, and a return channel operatively associated with the bottom wall. The diverting aperture diverts the brewing water to the return channel, and the return channel directs the diverted brewing water to the associated container when the brewing water overflows the cavity.

In accordance with yet another aspect of the present invention, a brewing machine for brewing a quantity of a brewed beverage by directing a flow of heated brewing water an infusible substrate is provided that comprises a housing defining a reservoir. The housing includes a brew basket support and a platform having a warmer plate which supports a beverage receiving container underneath the brew basket support. A heater assembly is disposed within the housing and in communication with the reservoir. The heater assembly is operative to receive the brewing water from the reservoir, heat the brewing water, and distribute the brewing water to a brew basket disposed within the brew basket support. The brew basket includes a bottom wall having a drain opening for allowing the brewing water to flow therethrough and into the beverage receiving container. An annular sidewall that upwardly extends from the bottom wall defines a body portion having a cavity therein. The cavity is capable of receiving the infusible substrate and the brewing water. The brew basket further includes an overflow return mechanism operably associated with the body portion. The overflow return mechanism is operative to divert the brewing water and direct the brewing water to the beverage receiving container when the brewing water overflows the cavity.

In accordance with still another aspect of the present invention, a brew basket is provided that comprises an upper cylindrical portion, a conical middle portion, and a cylindrical lower portion, integrally connected to form a body portion. A bottom wall having a drain opening is coupled orthogonally to the body portion at approximately between the middle portion and the lower portion thereby defining an upper cavity and a lower cavity. The upper cavity is operative to receive an infusible substrate and a brewing fluid. The brew basket further comprises an overflow return mechanism that includes a diverting aperture disposed through the upper portion of the body portion. A return channel, which is operably associated with the bottom wall receives the brewing water that has been diverted by the diverting aperture and directs the brewing water to an associated container when the brewing water overflows the cavity.

In accordance with still yet another aspect of the present invention, a brewing container is provided that comprises a bottom wall having a drain opening. The brew basket also comprises an-annular sidewall that upwardly extends from the bottom wall to define a body portion having a cavity therein. The annular sidewall has a diverting aperture disposed in an upper portion thereof. A flow channel is further disposed on an outer surface of the annular sidewall. A lever is mounted to a bottom surface of the bottom wall of the brewing container and has a return channel therein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
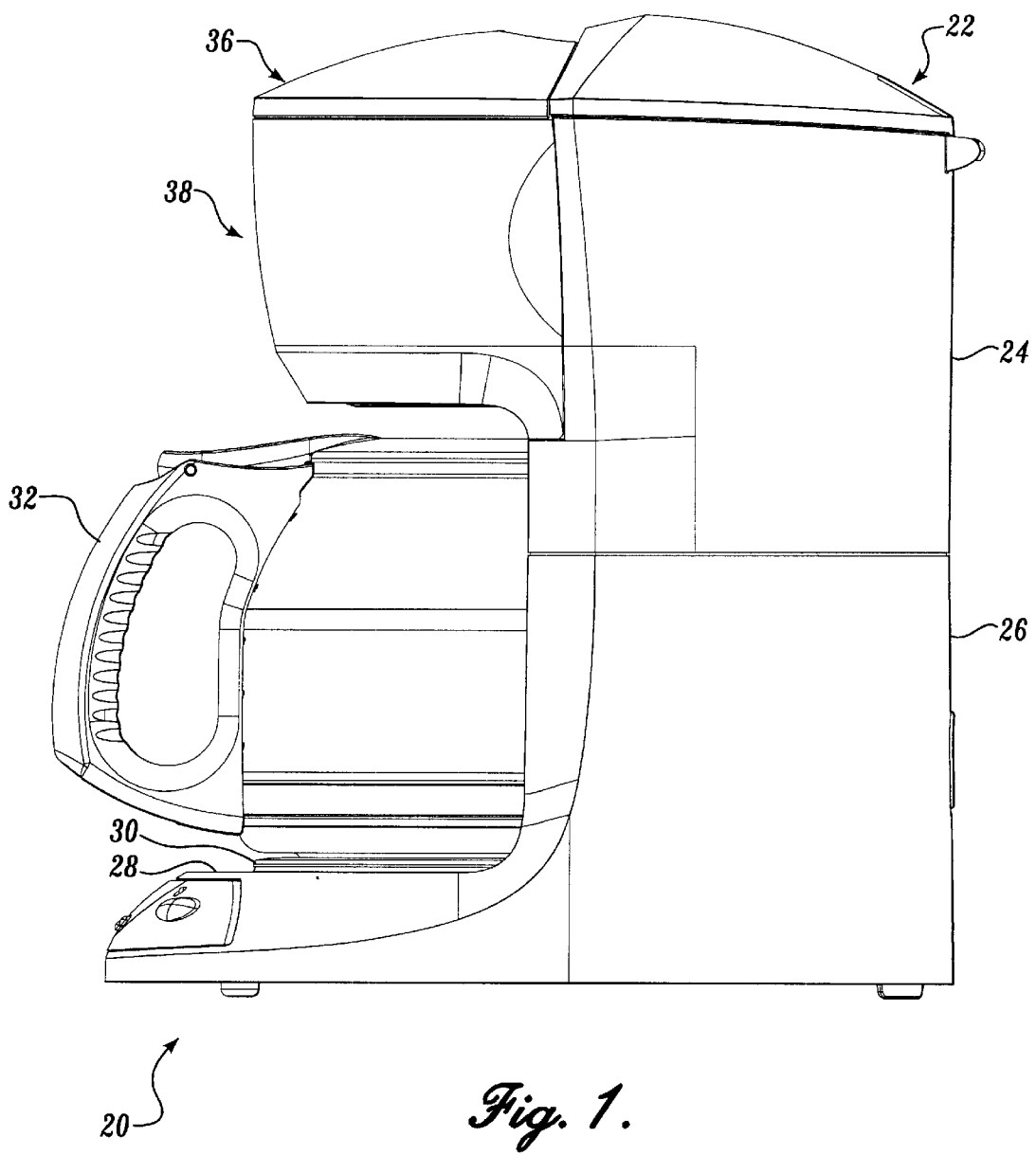
FIG. 1 illustrates a side elevation view of an exemplary coffee maker incorporating a brew basket formed in accordance with aspects of the present invention.

Prior to describing an exemplary embodiment of the improved brew basket with an overflow return mechanism, a brief discussion of the nature and operation of one type of coffee maker suitable for incorporating the present invention is set forth. In this regard, attention is directed to FIGS. 1–3, which illustrates selected components of a coffee maker 20. Referring to FIG. 1, the coffee maker 20 comprises a housing 22 formed from an upper housing section 24 and a lower housing section 26. The lower housing section 26 includes a platform 28 having a warmer plate 30 which supports a carafe 32. The upper housing section 24 defines a water reservoir 34 (FIG. 2) and a fluid distributor 36 and a brew basket assembly, generally designated 38. Other necessary coffee maker elements, such as supply and discharge conduits, are not shown so that the invention can be more easily seen, but well known to those familiar with coffee makers.

Figure 2:
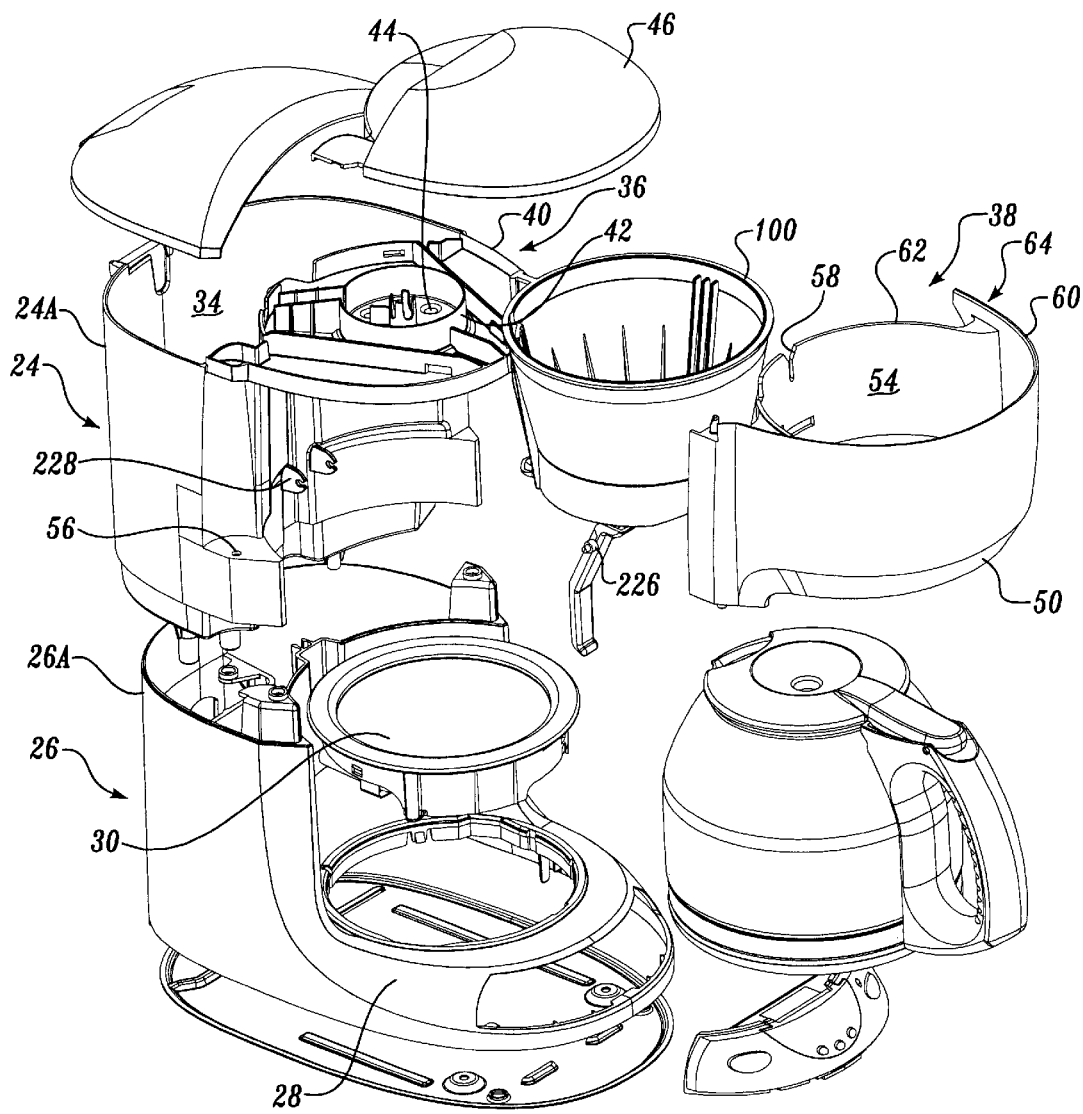
FIG. 2 illustrates an assembly view of the exemplary coffee maker shown in FIG. 1.
Figure 3:
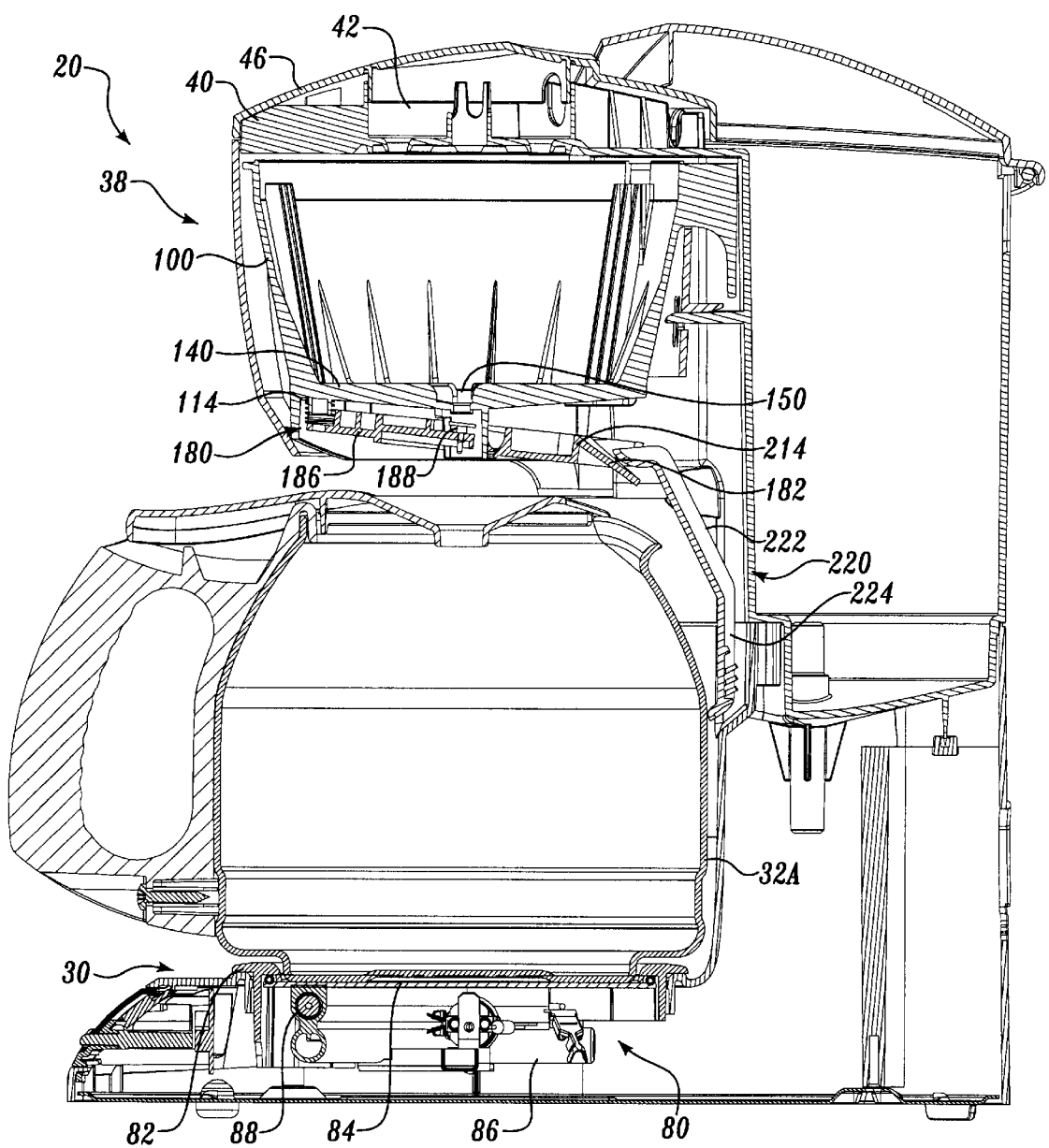
FIG. 3 illustrates a cross-sectional side elevation view of the exemplary coffee maker shown in FIG. 1.

As best shown in FIGS. 2 and 3, the upper housing section 24 includes a downwardly depending, generally crescent-shaped tower section 24A. The fluid distributor 36 is secured at the top of the upper housing section 24 and extends perpendicularly forward from the tower section 24A. The fluid distributor 36 comprises a lower support structure 40 including a shower head 42 having a water exit aperture 44, and a shower head lid 46. The brew basket assembly 38 also extends perpendicularly forward from the tower section 24A of the upper housing section 24, adjacent to and directly below the fluid distributor 36. The brew basket assembly 38 includes a brew basket support member 50 and a brew basket 100, with the brew basket support member 50 having a generally cylindrical interior cavity 54 for receiving the brew basket 100. The brew basket 100 will be explained in greater detail below. The brew basket assembly 38 is pivotally mounted relative to the tower section 24A of the upper housing section 24 for movement about a vertical axis, so that the brew basket 100 can be swung from beneath the fluid distributor 36. To gain access to the brew basket 100, the brew basket assembly 38 is rotated about the vertical axis at pivot point 56 to provide access to the interior of the brew basket 100 for insertion and removal of brewing material such as coffee or tea and filters.

As further shown in FIG. 3, the bottom of brew basket 100 may be provided with an anti-drip valve mechanism, indicated generally at 180, to control the flow of liquid from the brewing basket as a function of whether the carafe 32 is beneath the brew basket 100. The anti-drip valve mechanism 180 includes a lever 186 pivotally mounted to the underside of the brew basket and biased at one end to hold a stopper seal or plug 188 disposed at the other end firmly against an outlet opening 150 of brew basket 100. A ramp section 182 is located at the opposite end of lever arm 186 and positioned for pivotally displacing the lever arm and moving the stopper seal 188 away from the filter basket outlet opening when the ramp section 182 is contacted by an actuator. The anti-drip valve mechanism 180 utilized in conjunction with the brew basket 100 of the depicted exemplary embodiment of the invention is described in more detail below with reference to FIGS. 5 and 6.

Referring back to FIG. 2, the lower housing section 26 has an upwardly extending, generally crescent-shaped tower section 26A that is located immediately below tower section 24A of upper housing 24. The platform 28 of the lower housing section 26 extends perpendicularly forward from the tower section 26A of the lower housing section 26. The platform 28 supports a conventional carafe warmer plate 30 that is heated by a conventional automatic drip heater assembly 80, that is shown in FIG. 3 and is well known in the art. As shown in FIG. 3, the warmer plate 30 comprises a heater ring 82 dimensioned to contain the perimeter of the flat bottom of carafe 32 adjacent to a heating surface 84. Disposed directly below the heating surface 84 is the heater assembly 80 which comprises a U-shaped water heating tube 86 and a U-shaped heating element 88 coupled directly adjacent to the heating tube 86. Alternatively, the automatic drip heater assembly 80 can be located away from the underside of the heating surface 84 to prevent excessive heat transfer to the warmer plate 30 and carafe 32 for embodiments of the invention wherein the carafe is not intended to be externally heated.

In operation, with reference to FIG. 3, water from the reservoir 34 of coffee maker 20 is routed to the automatic drip heater assembly 80 through a supply conduit (not shown). At heater assembly 80, the water is heated and pumped by thermal expansion through a discharge conduit (not shown) to the shower head 42 at the top of the fluid distributor 36 for drainage or dispersion into the brew basket 100. As the heated water is distributed to the brew basket assembly 38 and drains through the ground coffee or other infusible substrate within the brew basket 100 and into the carafe 32, flavor is extracted from the infusible substrate to thereby produce coffee or another desired beverage.

As previously noted, the present invention is directed to an improved brew basket with an overflow return mechanism that is particularly suitable for use in a coffee maker of the type illustrated in FIGS. 1–3, and briefly described above. An exemplary embodiment of an improved brew basket 100 formed in accordance with the invention is illustrated in FIGS. 4–7 and comprises a generally cylindrical shape body 102 that is dimensioned to be received within the brew basket support member 50 shown in FIGS. 2 and 3. Additionally, the brew basket 100 includes an anti-drip valve mechanism 180 that controls the flow of water from the brewing basket dependent upon the presence of the carafe underneath the basket. The brew basket 100 further includes an overflow return mechanism 240 that diverts the possible overflow of brewed beverage and redirects the overflow back to the carafe. The overflow mechanism and the anti-drip valve mechanism are described in more detail below. The brew basket support member 50 includes a semi-circular outer wall 60 and a semi-circular inner wall 62 joined to the outer wall to form a generally cylindrical wall 64. The cylindrical wall 64 is open at both its upper and lower ends to define a generally cylindrical cavity 54 for receiving and holding the brew basket 100.

Figure 4:
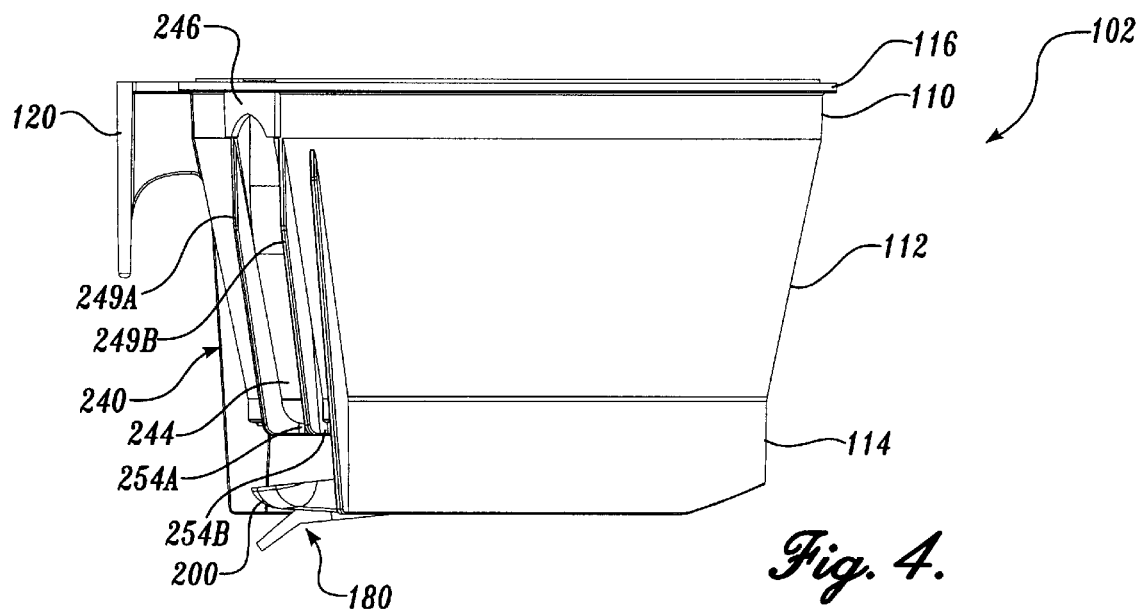
FIG. 4 illustrates a side elevational view of an exemplary embodiment of a brew basket formed in accordance with aspects of the present invention.
Figure 6:
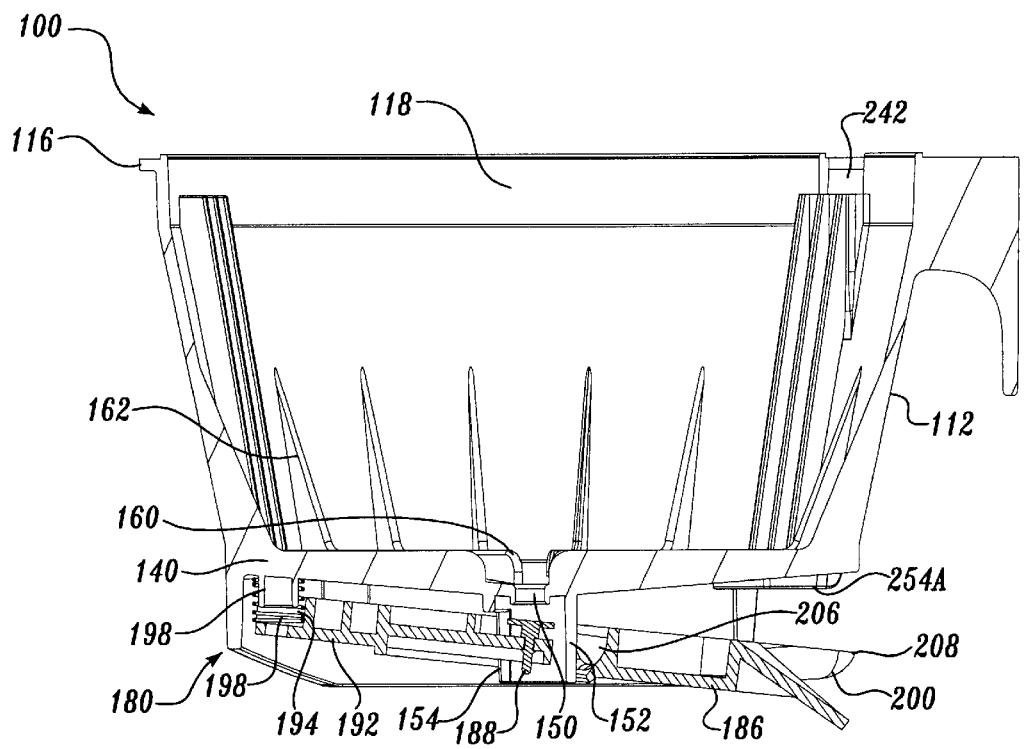
FIG. 6 illustrates a cross-sectional view of the brew basket shown in FIG. 5 taken along line 6—6 of FIG. 5.

Referring now to FIG. 4, the brew basket 100 comprises a generally cylindrical upper portion 110, a generally conical middle portion 112, and a generally cylindrical lower portion 114. The upper portion 110 includes an outwardly extending annular lip portion 116 at the upper end thereof which defines a mouth portion 118 (FIG. 6). The lip portion 116 is suitably dimensioned to rest on the inner wall 62 of brew basket support structure 50 (FIG. 2). The brew basket 100 and the inner wall 62 of the brew basket support structure 50 preferably include interlocking, locating means to position the brew basket 100 in a preferred orientation within brew basket support structure 50. In the embodiment shown, brew basket 100 includes an outward projecting handle portion 120 dimensioned to be received in a vertically aligned slot 58 disposed at the upper edge of the inner wall 62, as shown in FIG. 2. The handle portion 120 thus permits insertion of brew basket 100 into brew basket support structure 50 in only one position.

Figure 5:
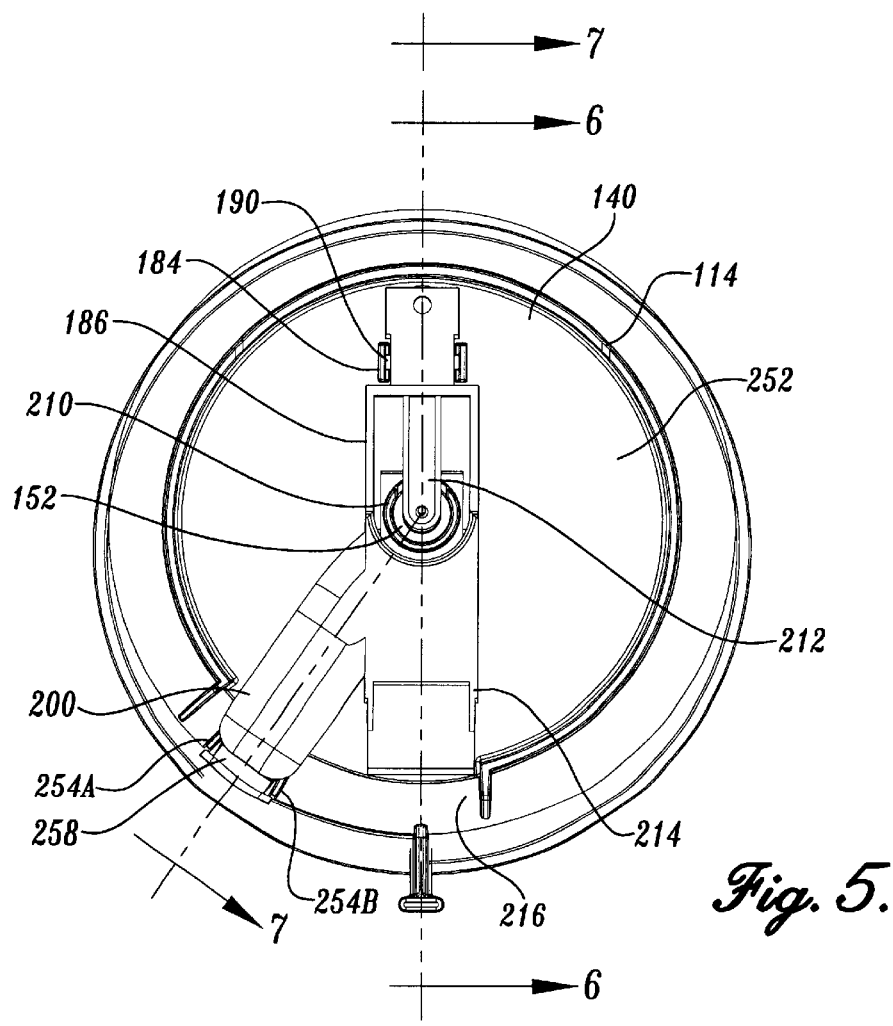
FIG. 5 illustrates a bottom view of the exemplary embodiment of the brew basket shown in FIG. 4.

Near the lower end of the conical portion 112, a transverse bottom wall 140 is provided and defines an upper cavity 142 and a lower cavity 144, as best shown in FIG. 6. Upper cavity 142 is generally frusto-conical in shape and is utilized for holding coffee, tea or the like. The upper cavity 142 is dimensioned to receive a typical filter (not shown). Brew basket 100 also includes an outlet opening 150 that is located at the center of the bottom wall 140. Preferably, the bottom wall of the brew basket is slightly tapered in a downward direction to facilitate drainage of the brewed beverage into outlet opening 150. A tubular extension 152 is disposed about outlet opening 150 and extends downwardly from the lower surface of the bottom wall 140 and into lower cavity 144. Extension 152 is generally cylindrical in shape and includes an opening 154, rectangular in shape, on one side thereof. In this respect, extension 152 is generally crescent-shaped, as best seen in FIG. 5. A plurality of elongated ribs 160 radiating outward from outlet opening 150 are included on the upper surface of bottom wall 140 to facilitate drainage through outlet opening 150 by providing space between the filter and the bottom wall of the brew basket. Similarly, a plurality of elongated ribs 162 radiating inward from the interior surface of the conical portion provides sufficient space between the interior wall of the brew basket 100 and the filter to increase the usable surface area of the filter.

Referring now to FIGS. 5 and 6, the brew basket 100 also includes an anti-drip valve mechanism 180 that controls the flow of liquid from the brewing basket dependent upon the presence of the carafe underneath the brew basket. The anti-drip valve mechanism 180 that includes a valve arrangement for opening and closing outlet opening 150 is provided within cavity 144. The valve arrangement is generally comprised of a valve lever 186 having a valve or plug 188 mounted thereon. Valve lever 186 is pivotally mounted by pins 190 integrally molded into valve lever 186 to a pair of lugs 184 which extend downwardly from the lower surface of bottom wall 140. Valve lever 186 includes a first end 192 having a recess 194 formed therein. The recess 194 is dimensioned to receive and contain a compression spring 198. A generally cylindrical boss 196 formed on the lower surface of bottom wall 140, is provided to position spring 198 relative to recess 194. Compression spring 198 biases lever 186 toward a first position in which plug or valve 188 covers outlet opening 150 thereby preventing flow therethrough.

Figure 7:
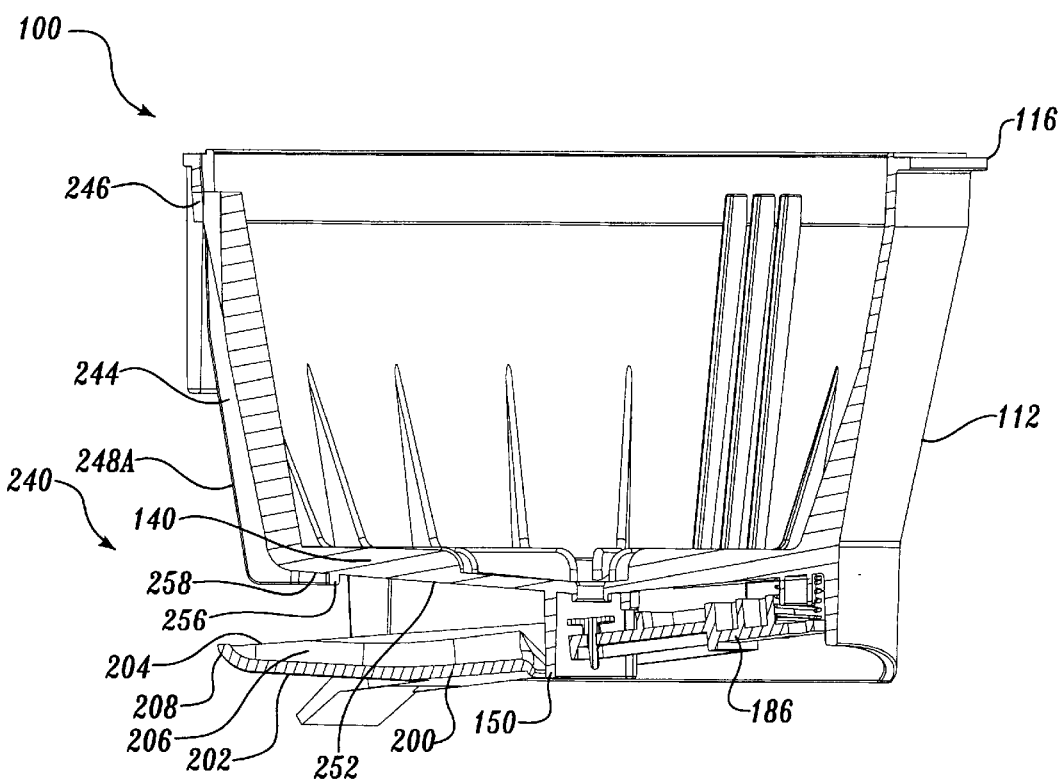
FIG. 7 illustrates a cross-sectional view of the brew basket shown in FIG. 5 taken along line 7—7 of FIG. 5.

Referring now to FIGS. 5 and 7 the valve lever 186 also includes a projecting member 200 that projects from the lever 186 at a defined angle that is in the same general plane as the bottom wall 140. The projecting member 200 includes a bottom wall 202 and two transversally extending sidewalls 204 that define an arcuate return channel 206 that extends through the projecting member. The projecting member 200 further includes an end wall 208 also extending transversally from the bottom wall 202 to provide a closed end to the return channel 206. See FIG. 6. The bottom of the return channel 206 gradually slopes downwardly as the return channel 206 extends radially inward toward the extension 152. The projecting member 200, which is part of the overflow return mechanism 240, will be describe in more detail below.

As best seen in FIG. 5, lever 186 includes a generally crescent-shaped opening 210, dimensioned to receive tubular extension 152. Opening 210 defines a tab 212 in valve lever 186 on which plug 188 (FIG. 6) is mounted and is flow communication with the arcuate channel 206 (FIG. 7) of the projecting member 200. Tab 212 is dimensioned to be received and move freely within the space bounded by tubular extension 152. In the embodiment shown, the opening 154 (FIG. 6) of tubular extension 152 faces toward the pinned end of valve lever 186. Valve lever 186 also includes a second or free end 214, which in the embodiment shown, extends slightly beyond lower portion 114, as best seen in FIG. 5. Included in the lower portion 114 is an opening 216 to accommodate free end 214 of valve lever 186 and the projecting member 200. Free end 214 of valve lever 186 is formed to include a ramp section 218.

The operation of valve lever 186 is controlled by an actuator 220, which is pivotally mounted to housing 22. As best shown in FIG. 3, actuator 220 includes an upper arm 222 dimensioned to operatively engage free end 214 of valve lever 186. As shown in the drawings, upper arm 222 extends through opening 216 and lower portion 114 of brew basket 100 and is normally disposed between the lower surface of bottom wall 140 and the upper surface of valve lever 186. Actuator 220 further includes a lower arm 224, which is dimensioned to engage the side 32A of carafe 32. In the embodiment shown, actuator 220 is integrally formed to include a pivot pin 226 (FIG. 2). Pin 226 is dimensioned to be snap-locked into a bracket 228 (FIG. 2) on housing 22, wherein actuator 220 is freely pivotable about pin 226. For a more detailed description of the exemplary anti-drip valve mechanism and the operation thereof, see U.S. Pat. No. 5,133,247 titled "Coffee maker", by John Pastrick, the subject matter of which is incorporated herein by reference.

Referring to FIGS. 4–7, the brew basket 100 further includes an overflow return mechanism 240 that diverts an overflow of brewed beverage and redirects the overflow into the carafe. The overflow return mechanism 240 is comprised, in part, of a diverting aperture such as a horizontal slot 242 (FIG. 6) disposed through the upper portion of the brew basket 100 directly below the annular lip portion 116. The slot 242 is in fluid communication with a flow channel 244 (FIG. 7) that extends downwardly over the outer surface of the brew basket 100. A shield portion 246 is disposed over the slot 242 to deflect the overflow down the flow channel 244. The flow channel 244 is formed by two spaced-apart elongate rib sections 248A, 248B that extend from the slot 242 to just past the conical middle portion 112 of the brew basket 100. The flow channel 244 is connected to another flow channel 258 located on the bottom surface 252 of the bottom wall 140. The flow channel 258 is formed by two spaced-apart elongate rib sections 254A, 254B that extend radially inward from the edge of the bottom surface 252 of bottom wall 140. A transverse end wall 256 interconnects the two elongate rib sections 254A, 254B to form a closed end of flow channel 258. The flow channels 244 and 258 form a unitary channel for diverting overflow from slot 242 at the upper end of the brew basket 100 so that the overflow is channeled downwardly along the outer surface of the brew basket and beneath the bottom wall 140 until it reaches the end wall 256. Since the flow channel 258 is located directly above the projecting member 200 of the valve lever 186, the projecting member 200 collects the overflow from flow channel 258 and redirects the overflow to the opening 210. Thus, it can be noted that the projecting member 200 is part of the overflow return mechanism 200.

While the exemplary embodiment of the brew basket 100 described above and illustrated herein has been show utilizing a projecting member 200 coupled directly to the valve lever 186 of the anti-drip valve mechanism 180 to redirect the overflow to the carafe, it will be readily apparent to those skilled in the art that the projecting member may be utilized in alternative configurations to accomplish the aforementioned function of redirecting the overflow to the carafe. For example, the projecting member 200 could be a separate member that attaches to the brew basket, preferably to the bottom thereof, to redirect the overflow to the carafe. Accordingly, the projecting member could attach to a brew basket that also incorporates a separate anti-drip valve mechanism, or may be attached to a brew basket without an anti-drip mechanism.

The operation of the brew basket constructed in accordance with aspects of the present invention will now be described with reference to FIGS. 4–7. During the brewing cycle, brewing water is supplied to the heating assembly 80 whereby the heating assembly 80 heats the brewing water and pumps the heating water by thermal expansion to the fluid distributor 36 mounted at the top of housing 22 of the coffee maker 20. The fluid distributor 36 distributes the brewing water into the brew basket 1 00 which contains ground coffee or another desired infusible substrate. As the brewing water infiltrates through the infusible substrate, the brewing water extracts flavor from the infusible substrate to produce the desired beverage.

During the brewing cycle, however, flow through the outlet opening of the brew basket 100 may become restricted. For example, the carafe could be misaligned within the housing 22 of the coffee maker 20 thereby causing the actuator to only partially displace the lever 186 away from the outlet opening 150 or the carafe 32 may have prematurely been removed from the coffee maker and has not been promptly replaced. In either case, the brewing water accumulates within the cavity 142 of the brew basket 100 as the brewing cycle continues to supply more brewing water. Once the brewing water within the cavity 142 reaches a level just below the lip portion 116 of the brew basket 100, the brewing water is diverted from within the cavity 142 of the brew basket 100 by slot 242. Diverted by the slot 242, the brewing water flows down the outside of the brew basket, adhering to the flow channel 244 until it reaches the bottom of the brew basket 100. Because the brewing water is adhering to the channel 244, the diverted brewing water continues to flow underneath the brew basket 100 and into the channel 258 until it reaches the end wall 256 of channel 258. The end wall 256 of channel 258 causes the overflowing brewing water to drip into the return channel 206 which is included within the projecting member 200. Because the return channel 206 within the projecting member 200 is slightly tapered in a downwardly direction, the overflowing brewing water flows radially inward toward the extension 152. The opening 210, located around the outside of the extension 152, allows the brewing water to escape through the opening 210 and into the carafe 32. Since the overflow return mechanism diverts brewing water from within the cavity of the brew basket, redirects the brewing water down the outside of the brew basket, and returns the brewing water to the carafe underneath the brew basket, the problems associated with an overflow are avoided.

It will be appreciated by those skilled in the art that the brewing water does not completely adhere to the outside of the brew basket 100 at the point at which the brewing water follows the channel 244 underneath the bottom wall 140 into channel 258. At this point, the brewing water may drop from the outside surface of the brew basket 100 at a lower edge portion and into the return channel 206 formed within the projecting member 200.

While the preferred embodiment of the invention has been illustrated and described, it will be appreciated that various changes can be made therein without departing from the spirit and scope of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A brewing container for retaining an infusible substrate and for receiving brewing water, comprising:
   a body portion including a bottom wall having a centrally located drain opening for allowing brewing water to flow therethrough and into an associated container therebelow, and sidewalls upwardly extending from said bottom wall defining a cavity therein, said cavity for receiving said infusible substrate and the brewing water; and
   an overflow return mechanism operably associated with said body portion, said overflow return mechanism operative to divert the brewing water to said associated container when the level of the brewing water in said cavity reaches an overflow condition in which the brewing water might otherwise overflow from said cavity.

2. The container of claim 1, wherein said overflow return mechanism comprises a diverting aperture through said body portion that allows the brewing water to flow therethrough when the brewing water in said cavity reaches the overflow condition.

3. The container of claim 2, wherein said overflow return mechanism further comprises a first channel operative to return the brewing water to said associated container.

4. The container of claim 3, wherein said overflow return mechanism further comprises a second channel disposed on an outside surface of said body portion and in communication with said diverting aperture.

5. The container of claim 4, wherein said overflow return mechanism further comprises a lever mounted to said body portion, said lever having said first channel therein.

6. The container of claim 3, wherein said overflow return mechanism further comprises a lever mounted to said body portion, said lever having said first channel therein.

7. The container of claim 6, wherein said lever is substantially parallel to said bottom wall of said body portion.

8. The container of claim 5, wherein said first channel collects brewing water from said second channel, with said first channel being disposed underneath said second channel.

9. The container of claim 5, wherein said lever is pivotally mounted to said body portion, said lever including a seal disposed thereon for sealing said drain opening when said associated container is removed from under said body portion.

10. The container of claim 5, wherein said lever includes an outlet aperture in communication with said first channel, said outlet aperture allowing said brewing water to flow into the associated container.

11. The container of claim 10, wherein said lever includes a projecting member, said projecting member including said first channel therein.

12. The container of claim 11, wherein said first channel collects said brewing water from said second channel, said first channel being disposed underneath said second channel.

13. The container of claim 12, further comprising a third channel, said third channel being in fluid communication with said second channel and being disposed on a bottom surface of said bottom wall of said body portion.

14. The container of claim 13, wherein said third channel is formed by two spaced-apart elongate rib sections.

15. The container of claim 12, wherein said projecting member is substantially parallel to said bottom wall of said body portion.

16. The container of claim 15, wherein said lever is pivotally mounted to said body portion, said lever including a seal disposed thereon for sealing said drain opening when said associated container is removed from under said body portion.

17. The container of claim 8, wherein said second channel is formed by two spaced-apart elongate rib sections.

18. The container of claim 12, wherein said second channel is formed by two spaced-apart elongate rib sections.

19. The container of claim 3, wherein said diverting aperture is a slot disposed proximate to an upper edge of said sidewall of said body portion, said upper edge forming an opening that defines a mouth of said cavity.

20. The container of claim 3, wherein the overflow return mechanism further comprises a shield plate coupled to an outside surface of said body portion at the location of said diverting aperture, said shield plate operative to divert said brewing water down said outside surface of said body portion.

21. The container of claim 1, wherein said brewing container is a brew basket for use with a coffee maker.

22. A brewing container comprising:
   a bottom wall having a drain opening for allowing brewing water to flow therethrough and into an associated container;
   contiguous sidewalls upwardly extending from said bottom wall defining a body portion having a cavity therein and an outer surface, said cavity for receiving an infusible substrate and brewing water; and
   an overflow return mechanism including a diverting aperture disposed through said body portion, a return channel operatively associated with said bottom wall, and a flow channel in communication with said diverting aperture and said return channel, said flow channel formed on said outer surface of said body portion;
   wherein said diverting aperture diverts said brewing water to said return channel by said flow channel when the level of the brewing water in said cavity reaches an overflow condition, and said return channel directs the brewing water to said associated container.

23. The brewing container of claim 22, wherein said flow channel is formed by spaced-apart rib sections extending outward from said outer surface of said body portion.

24. The brewing container of claim 22, wherein said overflow return mechanism further comprises a lever connected to said bottom wall, said lever having an outlet aperture and two-spaced apart sidewalls that form said return channel, said return channel being in communication with said outlet aperture.

25. The brewing container of claim 22, wherein said return channel and said flow channel are substantially transverse to each other.

26. The brewing container of claim 25, wherein said overflow return mechanism further comprises a shield plate coupled to an outside surface of said body portion at said diverting aperture, said shield plate operative to divert the brewing water down said outside surface of said body portion.

27. A brewing machine for brewing a quantity of a brewed beverage by directing a flow of heated brewing water over an infusible substrate, said brewing machine comprising:
   a housing defining a reservoir for storing brewing water, said housing including a brew basket support and a platform, which supports a beverage receiving container underneath said brew basket support; and a heater assembly disposed within said housing and in communication with said reservoir, said heater assembly being operative to receive the brewing water from said reservoir, heat the brewing water, and distribute the brewing water to a brew basket disposed within said brew basket support;

said brew basket including a bottom wall having a centrally located drain opening for allowing the brewing water to flow therethrough and into said beverage receiving container; and sidewalls upwardly extending from said bottom wall to define a body portion having a cavity therein, said cavity operative to receive the infusible substrate and the brewing water; and an overflow return mechanism operably associated with said body portion, said overflow return mechanism operative to divert the brewing water from the cavity and direct the brewing water to said beverage receiving container when a pre-selected volume of the brewing water occupies said cavity.

28. The brewing machine of claim 27 further comprising a return channel located on the external surface of said brew basket and wherein said overflow return mechanism comprises a diverting aperture disposed through said annular sidewall of said brew basket, said diverting aperture being in fluid communication with said cavity to direct brewing water to said return channel.

29. The brewing machine of claim 28, wherein said overflow return mechanism further comprises a flow channel in communication with said diverting aperture and said return channel, said overflow channel disposed on an outside surface of said body portion.

30. The brewing container of claim 29, wherein said overflow return mechanism further comprises a lever connected to said bottom wall of said brew basket, said lever having an outlet aperture and two-spaced apart sidewalls that form said return channel, with said return channel being in communication with said outlet aperture.

31. The brewing machine of claim 30, wherein said lever includes a seal disposed thereon for sealing said drain opening when said beverage receiving container is removed from underneath said body portion.

32. The brewing machine of claim 31, wherein said lever is substantially parallel to said bottom wall of said body portion.

33. In a coffee maker having a housing that defines a water reservoir, said housing including a brew basket support and a platform which supports a beverage receiving container underneath said brew basket support, a heater assembly in communication with said reservoir, said heater assembly receiving brewing water from said reservoir and heating the brewing water, a brew basket disposed within said brew basket support for receiving the brew water, said brew basket comprising:

a bottom wall having a centrally located outlet opening for allowing the brewing water to flow therethrough and into said beverage receiving container; and sidewalls upwardly extending from said bottom wall defining a cavity having an opening formed by a rim section said cavity for receiving infusible substrate and the brewing water; and an overflow return mechanism operably associated with said body portion, said overflow mechanism operative to divert the brewing water and to direct the brewing water to said beverage receiving container to prevent the brewing water from flowing over said rim section.

34. The brew basket of claim 33, wherein said overflow return mechanism includes a diverting aperture disposed within said annular sidewall, a lever operably mounted to said bottom wall, said lever having a return channel disposed therein, and a flow channel positioned on an outside section of said body portion, said flow channel in communication with said diverting aperture and said return channel.

35. A brew basket comprising:

an upper cylindrical portion, a conical middle portion, and a cylindrical lower portion, integrally connected to form a body portion;

a bottom wall having an outlet opening, said bottom wall coupled orthogonally to said body portion at approximately between said middle portion and said lower portion thereby defining an upper cavity and a lower cavity, said upper cavity operative to receive an infusible substrate and a brewing fluid;

an overflow return mechanism including a diverting aperture disposed through said upper portion of said body portion, and a return channel operably associated with said bottom wall;

wherein said diverting aperture diverts the brewing water to said return channel, and said return channel directs the brewing water to an associated container when the brewing water overflows said cavity.

36. The brew basket of claim 35, wherein said overflow return mechanism further includes a lever mounted to said bottom wall within said lower cavity, said lever having said return channel therein.

37. The brew basket of claim 35, wherein said overflow return mechanism further includes a second channel in communication with said diverting aperture and said return channel.

38. The brew basket of claim 37, wherein said second channel is formed by two space-apart elongate rib sections extending from an outside surface of said body portion.

39. The brew basket of claim 38, wherein said return channel is positioned underneath said second channel to collect the brewing water therefrom.

40. The brew basket of claim 36, wherein said lever is substantially parallel to said bottom wall of said body portion.

41. The brew basket of claim 40, wherein said lever includes a seal disposed thereon for sealing said drain aperture when said associated container is removed from under said body portion.

42. In a coffee maker having a housing that defines a water reservoir, a housing including a brew basket support and a platform which supports a beverage receiving container underneath said brew basket support, a heater assembly in communication with said reservoir, said heater assembly receiving brewing water from said reservoir, heating the brewing water, and distributing the brewing water to a brew basket disposed within said brew basket support, said brew basket having a bottom wall having a drain aperture for allowing the brewing water to flow therethrough and into the beverage receiving container; sidewalls upwardly extending from said bottom wall defining a body portion having a cavity therein, said cavity for receiving an infusible substrate and the brewing water, and an valve mechanism operably mounted to a bottom surface of said bottom wall, said valve mechanism for sealing said drain aperture when said beverage receiving container is removed from under said body portion, the improvement comprising: an overflow return mechanism for removing brewing water from said cavity under cavity overflow conditions, said overflow return mechanism including a diverting aperture disposed through said body portion, and a return channel operatively associated with said valve mechanism, wherein said diverting aperture diverts brewing water to said return channel, and said return channel directs brewing water to said beverage receiving container to prevent brewing water from overflowing said cavity.

43. The improvement of claim 42, wherein said overflow return mechanism comprises a flow channel disposed on an outside surface of said body portion, said flow channel supplying said brewing water from said diverting aperture to said return channel.

44. The improvement of claim 43, wherein said valve mechanism of said coffee maker includes a projecting member coupled to a lever having a seal disposed thereon, and wherein said return channel of said overflow return mechanism is formed within said projecting member.

45. A brew basket comprising:
   a bottom wall having and outlet opening for allowing brewing water to flow therethrough and into an associated container;
   sidewalls upwardly extending from said bottom wall to define a body portion having a cavity therein, said cavity operative to receive an infusible substrate and brewing water; and
   overflow return means operably associated with said body portion for diverting a portion of the brewing water from said cavity and directing the diverted brewing water to said beverage receiving container to prevent overflow of brewing water from said cavity, wherein said overflow return means includes a diverting aperture disposed through said body portion, a return channel operatively associated with said bottom wall, and a flow channel interconnecting said diverting aperture and said return channel in fluid communication, said flow channel formed by spaced-apart rib sections extending outward from the outer surface of said body portion.

46. The brew basket of claim 45, wherein said overflow return means further comprises a lever that is operably mounted to said brew basket bottom wall and has said return channel disposed therein, said flow channel dimensioned and arranged to direct brewing water from said diverting aperture to said return channel.

47. A brewing container comprising:
   a bottom-wall having outlet opening;
   an annular sidewall upwardly extending from said bottom wall to define a body portion having a cavity therein, said annular sidewall having a diverting aperture disposed in an upper portion thereof, and having a flow channel disposed on an outer surface thereof; and
   a lever mounted to a bottom surface of said bottom wall, said lever having a return channel therein.

48. The brewing container of claim 47, wherein said flow channel is in fluid communication with said diverting aperture and said return channel.

49. The brewing container of claim 47, wherein said lever includes a projecting member and a seal disposed on said projecting member for sealing said outlet opening when an associated container is removed from under said body portion, and wherein said return channel is formed in said projecting member.

50. The brewing container of claim 49, wherein said lever further includes an outlet aperture, and said projecting member further includes two-spaced apart sidewalls that form said return channel with said return channel being in fluid communication with said outlet aperture.

* * * * *